United States Patent

Sato

[11] Patent Number: 5,829,024
[45] Date of Patent: Oct. 27, 1998

[54] HIERARCHICAL CACHE MEMORY SYSTEM AND METHOD FOR CONTROLLING DATA COHERENCY BETWEEN A PRIMARY AND A SECONDARY CACHE

[75] Inventor: Taizo Sato, Kawasaki, Japan

[73] Assignee: Fujitsu Limited, Kawasaki, Japan

[21] Appl. No.: 676,506

[22] Filed: Jul. 8, 1996

Related U.S. Application Data

[63] Continuation of Ser. No. 63,656, May 20, 1993, abandoned.

[30] Foreign Application Priority Data

May 21, 1992 [JP] Japan .................................. 4-128755

[51] Int. Cl.⁶ .............................. G06F 12/08; G06F 13/00
[52] U.S. Cl. .......................... 711/122; 711/117; 711/118; 711/154; 711/160
[58] Field of Search .................................. 395/444, 445, 395/446, 449, 460, 463, 470, 468, 469, 486, 487; 364/DIG. 1, 243.4

[56] References Cited

U.S. PATENT DOCUMENTS

| | | | |
|---|---|---|---|
| 4,996,641 | 2/1991 | Talgam et al. | 395/463 |
| 5,136,700 | 8/1992 | Thacker | 395/400 |
| 5,276,848 | 1/1994 | Gallagher et al. | 395/448 |
| 5,285,323 | 2/1994 | Hetherington et al. | 395/425 |
| 5,307,477 | 4/1994 | Taylor et al. | 395/425 |
| 5,325,503 | 6/1994 | Stevens et al. | 395/473 |
| 5,359,723 | 10/1994 | Mathews et al. | 395/449 |
| 5,367,659 | 11/1994 | Iyengar et al. | 395/463 |
| 5,369,753 | 11/1994 | Tipley | 395/425 |
| 5,386,547 | 1/1995 | Jouppi | 395/425 |
| 5,434,992 | 7/1995 | Mattson | 395/463 |

*Primary Examiner*—Tod R. Swann
*Assistant Examiner*—Tuan V. Thai
*Attorney, Agent, or Firm*—Staas & Halsey

[57] ABSTRACT

A hierarchical memory system having a cache memory for storing a portion of data stored in a main memory. The cache memory is divided into hierarchically ordered primary and secondary cache memories. The primary cache memory being connected to a processor. The larger secondary cache memory being connected to the primary cache memory and to a bus connected to the main memory. When a cache miss-hit is made in the secondary cache memory, at the time of access by the processing unit, the secondary cache memory notifies the primary cache memory of an address of a replacement entry prior to seeking a data transfer. The primary cache memory, when it has an entry corresponding to the replacement entry, makes the corresponding entry the replacement entry. When the primary cache memory does not have an entry corresponding to the replacement entry, the primary cache memory makes an entry based on a predetermined replacement priority and then enters data transferred from the secondary cache memory into the replacement entry.

8 Claims, 12 Drawing Sheets

| SET-ADDRESS | WAY0 | WAY1 | WAY2 | WAY3 | | LRU |
|---|---|---|---|---|---|---|
| 00 | 00000 | 00010 | 00004 | 00002 | | 1302 |
| 01 | | | | | | |
| 02 | | | | | | |
| FF | 00010 | 0000F | 00003 | 00007 | | 0123 |

FIG. 10

| SET-ADDRESS | WAY0 | WAY1 | WAY2 | WAY3 | | LRU |
|---|---|---|---|---|---|---|
| 000 | 00000 | 00020 | 00004 | 00010 | | 1230 |
| 001 | | | | | | |
| 002 | | | | | | |
| 100 | 00001 | 00011 | 00005 | 0000D | | 1302 |
| 200 | 00012 | 00002 | 00006 | 0000A | | 2130 |
| 300 | 00007 | 00013 | 0000F | 00003 | | 3201 |
| 3FF | 00017 | 0000F | 00003 | 00007 | | 0123 |

FIG. 11

| SET-ADDRESS | WAY0 | WAY1 | WAY2 | WAY3 | | LRU |
|---|---|---|---|---|---|---|
| 00 | 00008 | 00010 | 00004 | 00002 | | 0132 |
| 01 | | | | | | |
| 02 | | | | | | |
| FF | 00010 | 0000F | 00003 | 00007 | | 0123 |

FIG. 12

| SET-ADDRESS | WAY0 | WAY1 | WAY2 | WAY3 | | LRU |
|---|---|---|---|---|---|---|
| 000 | 00008 | 00020 | 00004 | 00010 | | 0123 |
| 001 | | | | | | |
| 002 | | | | | | |
| 100 | 00001 | 00011 | 00005 | 0000D | | 1302 |
| 200 | 00012 | 00002 | 00006 | 0000A | | 2130 |
| 300 | 00007 | 00013 | 0000F | 00003 | | 3201 |
| 3FF | 00017 | 0000F | 00003 | 00007 | | 0123 |

FIG. 13

| SET-ADDRESS | WAY0 | WAY1 | WAY2 | WAY3 | | LRU |
|---|---|---|---|---|---|---|
| 00 | 00000 | 00010 | 00009 | 00002 | | 2130 |
| 01 | | | | | | |
| 02 | | | | | | |
| ... | | | | | | |
| FF | 00010 | 0000F | 00003 | 00007 | | 0123 |

FIG. 14

| SET-ADDRESS | WAY0 | WAY1 | WAY2 | WAY3 | | LRU |
|---|---|---|---|---|---|---|
| 00 | xxxxx | 00010 | 00008 | 00002 | | 2130 |
| 01 | | | | | | |
| 02 | | | | | | |
| ... | | | | | | |
| FF | 00010 | 0000F | 00003 | 00007 | | 0123 |

FIG. 15

HIERARCHICAL CACHE MEMORY SYSTEM AND METHOD FOR CONTROLLING DATA COHERENCY BETWEEN A PRIMARY AND A SECONDARY CACHE

This application is a continuation-in-part, of application Ser. No. 08/063,656, filed May 20, 1993, now abandoned.

BACKGROUND OF THE INVENTION

1. Field of the Invention

The present invention relates to a hierarchical cache memory system in which a cache memory provided in a processor system to reduce access times, and more specifically to a cache memory that is divided into a very-high-speed, small-capacity primary cache memory and a high-speed, medium-capacity secondary cache memory.

2. Description of the Related Art

In order to increase the speed of a processor system, the speed of a system bus. However, since the system bus must be increased connects with interface circuits which control I/O input/output devices, etc., increasing the speed of the system bus will increase the cost of the system. For this reason, a separate high-speed memory to which the processor is permitted to make direct access, is provided to increase processing by the CPU.

When the speed of the CPU is further increased, cost will be increased by increasing the capacity of the above memory, that is, the cache memory to medium capacity. For this reason, a system in which an additional cache memory is provided between the above cache memory and the CPU is used. Such a system is equipped with a primary cache memory located close to the CPU and a secondary cache memory located between the primary cache memory and the main memory connected with the system bus. In general, the primary cache memory is of very high speed and small capacity, while the secondary cache memory is of high speed and medium capacity. The speed of system processing is improved by the use of the primary and secondary cache memories.

The use of the primary and secondary cache memories permits the CPU to conduct processing independently of the system bus to which the main memory is connected. Thus, a plurality of CPUs may be provided.

FIG. 1 shows the main portion of an example of a multiprocessor system. Processors 1 and 2 have processing units 3 and 4, or CPUs, for performing processing in the processors 1 and 2, respectively. Very-high-speed, small-capacity primary cache memories 5 and 6 are built into the processors 1 and 2, respectively. High-speed, medium-capacity secondary cache memories 7 and 8 are associated with the processors 1 and 2, respectively. Local memories 9 and 10 are connected to the processors 1 and 2, respectively. A system bus 11 connects a main memory 12, shared between the processors 1 and 2, to the processors 1 and 2.

Since the processors 1 and 2 have their respective built-in primary cache memories 5 and 6, each of the processing units 3 and 4 is permitted to make access to its associated primary cache memory so as to perform desired processing. In the absence of an object program in the corresponding primary cache memory, it is read out of the corresponding secondary cache memory and then transferred to the primary cache memory for execution. In the absence of the object program in the corresponding secondary cache memory as well, it is read out of the main memory and then transferred to the corresponding primary cache memory via the corresponding secondary cache memory for execution.

In FIG. 2, the processors 1 and 2, the secondary cache memories 7 and 8, local memories 9 and 10, and the main memory 12, which comprise the multiprocessor system having primary and secondary cache memories, are interconnected by buses B1 to B4 each composed of address, data and control buses. The secondary cache memories 9 and 10 and the main memory 12 are interconnected by the system bus 11. Each of the processors, connected by these buses B1 to B4, is permitted to perform processing separately.

Even if a plurality of processors concurrently execute programs, problems don't arise, because programs to be executed are not subject to any change and each of the processors is connected to a separate system bus. However, in a shared-memory type of multiprocessor system with hierarchical cache memories, the results of processing or data may be written into the memories during processing. Thus, the validity of data must be guaranteed. For example, when a certain processor has altered the contents of the main memory, if the cache memory in another processor is not informed of the updated contents of the main memory, the processor operates with the contents prior to being changed, thereby failing to perform normal operations.

The secondary cache memory, monitors the system bus to check whether the system bus has contents corresponding to an entry of the secondary cache memory. When the secondary cache memory has detects rewritten data of the main memory, a data guarantee process can be omitted if the corresponding entry can be invalidated.

If, however, the secondary cache memory does not exercise control over the primary cache memory, the primary cache memory will not be able to detect the rewriting of the main memory unless it directly monitors the system bus.

Thus, in large computer systems, the system bus is coupled to the primary cache memory to allow monitoring. This causes signals on the address bus, etc., to be doubled. Using a microcomputer requires a large number of signal lines and is thus impractical for a multiprocessor system.

If the secondary cache memory alerts the primary cache memory to all of store accesses in the system bus using a bus between the cache memories, the data guarantee problem will not arise. However, this will restrict the usage of the bus between the cache memories for its intended purposes. In other words, the benefit of installing the cache memories will be lost.

In a prior art microprocessor system, the secondary cache memory performs a snooping process on the primary cache memory. The secondary cache memory instructs the primary cache memory to make an entry invalid only when it needs to be made invalid. There are two methods for achieving this purpose.

In the first method causes the secondary cache memory has a copy of an address tag section of the primary cache memory and monitors the system bus for the primary cache memory.

In the second method the primary cache memory is instructed to make an entry invalid when replacing an entry due to a cache miss-hit and the main memory's being rewritten in the secondary cache memory.

However, problems arise in the case of the first method in that the amount of hardware required increases because the secondary cache memory has a copy of the address tag section of the primary cache memory. The interface also becomes complex because the secondary cache memory must be correctly informed of the replacement operation in the primary cache memory.

In the second method in which the primary cache memory is instructed to make an entry invalid when the replacement of an entry, due to a cache miss-hit, takes place in the secondary cache memory, it is after data transmission that the primary cache memory is instructed to make the entry invalid.

For this reason, a problem arises in the case of the second method in that a long time is taken from the occurrence of cache miss-hit in the secondary cache memory until the replacement in the primary cache memory. That is, the replacement in the primary cache memory is not performed quickly.

In the second method, an entry nullify instruction is issued to the primary cache memory when an entry is replaced due to a cache miss-hit. However, the primary cache memory is arranged to perform the replacement in accordance with the replacement priority before being informed of nullification from the secondary cache memory.

For this reason, empty entries are generated in the entries of the primary cache memory. Thus, the entries of the primary cache memory are not used in an efficient manner.

FIG. 3 is a diagram for use in explanation of such problems as described above.

In FIG. 3, 13 denotes a processor, 14 denotes a processing unit, 15 denotes a primary cache memory, 16 denotes a data storage section, 17 denotes replacement priority storage, 18 denotes a secondary cache memory, 19 denotes a data storage section, and 20 denotes replacement priority storage.

FIG. 3 shows a case where the replacement priority in the primary cache memory 15 is placed in the order of an entry corresponding to address AAA, . . . , an entry corresponding to address BBB, . . . , while the replacement priority in the secondary cache memory 18 is placed in the order of an entry corresponding to address BBB, . . . , an entry corresponding to address AAA, . . . .

The state where the primary and secondary cache memories 15 and 18 differ from each other in replacement priority as shown occurs when the LRU (least recently used) system is used for the replacement system.

That is, such a state occurs from the cause that, when a cache hit is made at an address in the primary cache memory 15, the replacement priority of the entry corresponding to that address is assigned the lowest priority (the entry becomes most difficult to expel) in the primary cache memory 15 but it does not change in the secondary cache memory 18.

In such a case as shown in FIG. 3, therefore, where a cache miss-hit occurs in the primary cache memory 15, an entry storing the address AAA becomes a candidate for replacement.

Next, when a cache miss-hit is also made in the secondary cache memory 18, an entry storing the address BBB becomes a candidate for replacement.

In this case, the secondary cache memory 18 tells the primary cache memory 15 to make the address BBB entry invalid after data transmission. For this reason, in the primary cache memory 15, the entry storing address BBB is also made a candidate for nullification in addition to the address AAA which has been made a candidate for replacement.

In the primary cache memory 15, therefore, an empty entry will be generated even if data has been transferred from the secondary cache memory 18. In this respect, the performance will be degraded.

SUMMARY OF THE INVENTION

The present invention relates to a hierarchical cache memory system in which a cache memory provided in a processor system to reduce access times, is divided into a very-high-speed, small-capacity primary cache memory and a high-speed, medium-capacity secondary cache memory. It is therefore an object of the present invention to provide a hierarchical cache memory system which, when an entry replacement due to cache miss-hit occurs in the secondary cache memory, permits a partial replacement in the primary cache memory to be performed at high speed and prevents an empty entry from being generated in the primary cache memory, thereby improving performance.

According to the present invention there is provided a hierarchical memory system in which a cache memory for storing part of data that a main memory stores is divided into hierarchically-ordered primary and secondary cache memories, the secondary cache memory being larger in storage capacity than the primary cache memory, characterized in that, when a cache miss-hit is made in the secondary cache memory at the time of access by a processing unit, the secondary cache memory notifies the primary cache memory of the address of a replacement entry prior to data transfer, and that the primary cache memory, when it has the corresponding entry, makes that entry the replacement entry, and, when not, makes an entry based on the replace priority the replacement entry, and then enters data transferred from the secondary cache memory into the replacement entry.

BRIEF DESCRIPTION OF THE DRAWINGS

FIG. 10 is a diagram illustrating the relationship of a tags of a primary cache memory to a LRU prior to accessing;

FIG. 11 is a diagram illustrating the relationship of a tags of a secondary cache memory to a LRU prior to accessing;

FIG. 12 is a diagram illustrating the relationship of a tags of a primary cache memory to a LRU after accessing;

FIG. 13 is a diagram illustrating the relationship of a tags of a secondary cache memory to a LRU after accessing;

FIG. 14 is a diagram illustrating the relationship of a tags of a primary cache memory to a LRU; and FIG. 15 is a diagram illustrating the conventional relationship of a tags of a primary cache memory to a LRU after accessing.

DETAILED DESCRIPTION OF THE PREFERRED EMBODIMENT

The present invention is directed to a hierarchical cache memory system which permits fast replacement of data stored in the primary cache memory in which a cache miss-hit is made at the time of read access or write access by a host device, for example, a processing unit. To this end, prior to data transfer, the secondary cache memory of the present invention alerts the primary cache memory to the address of a replacement entrys. When the primary cache memory, it has the corresponding entry, makes that entry the replacement entry. When the primary memory does not have the corresponding entry it, makes an entry based on the replace priority the replacement entry. Thereafter, the primary memory enters data transferred from the second cache memory into the replacement entry.

That is, in the present invention, when a cache miss-hit is made in the secondary cache memory at the time of read access or write access by the processing unit, the secondary cache memory informs the primary cache memory of the replacement entry address prior to data transfer.

In addition, when primary cache memory, has an entry corresponding to the replacement entry in the secondary cache memory, this entry becomes the replacement entry. When the primary memory does not have the corresponding entry, an entry based on the replace priority the replacement entry, is made permitting the generation of an empty entry to be prevented. That is, the present invention permits fast replacement of the primary cache memory at the time of read access or write access by the processing unit.

An embodiment of the present invention will be described in detail hereinafter.

Figure 1:
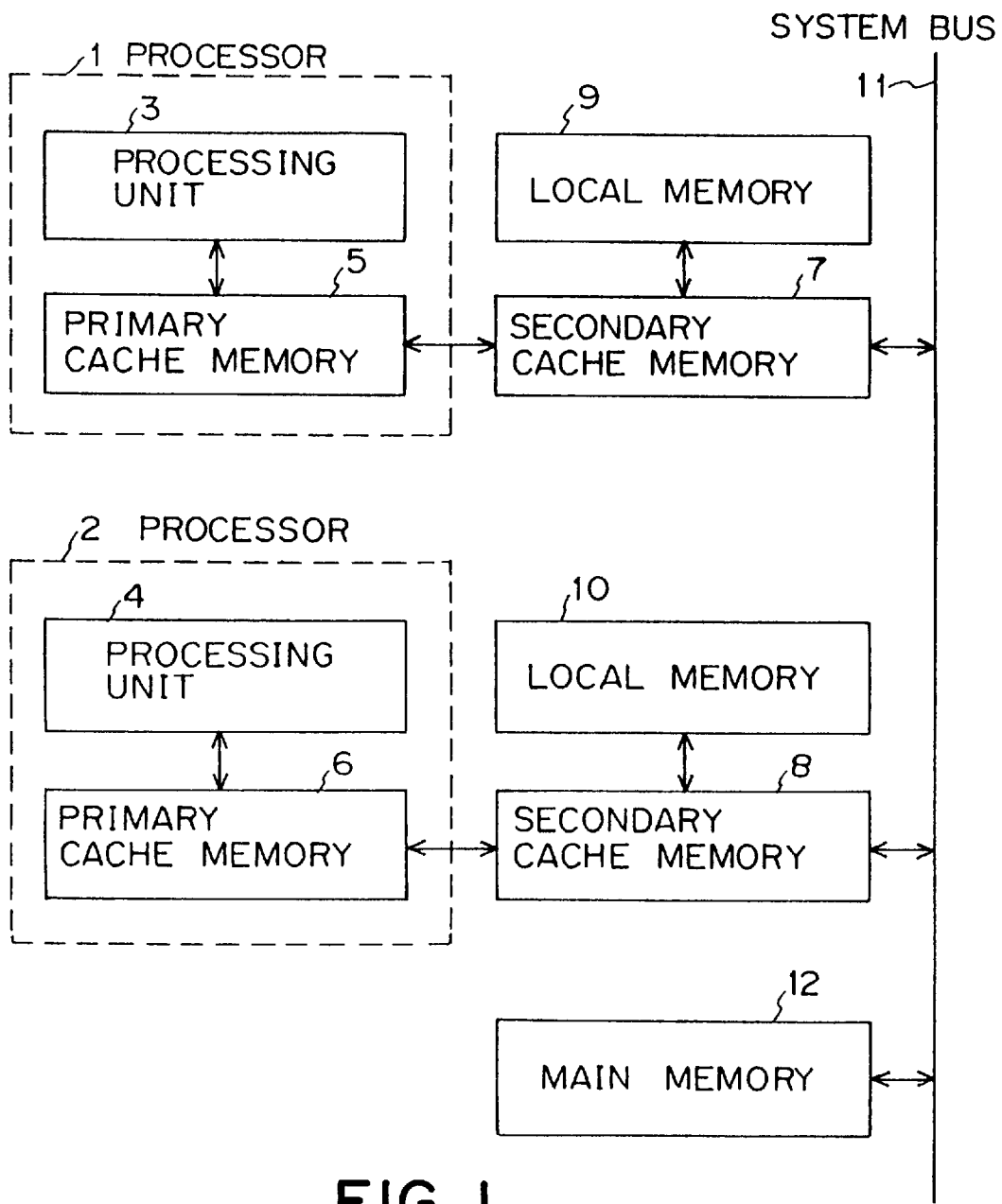
FIG. 1 is a block diagram of a multiprocessor system having hierarchical cache memories.
Figure 2:
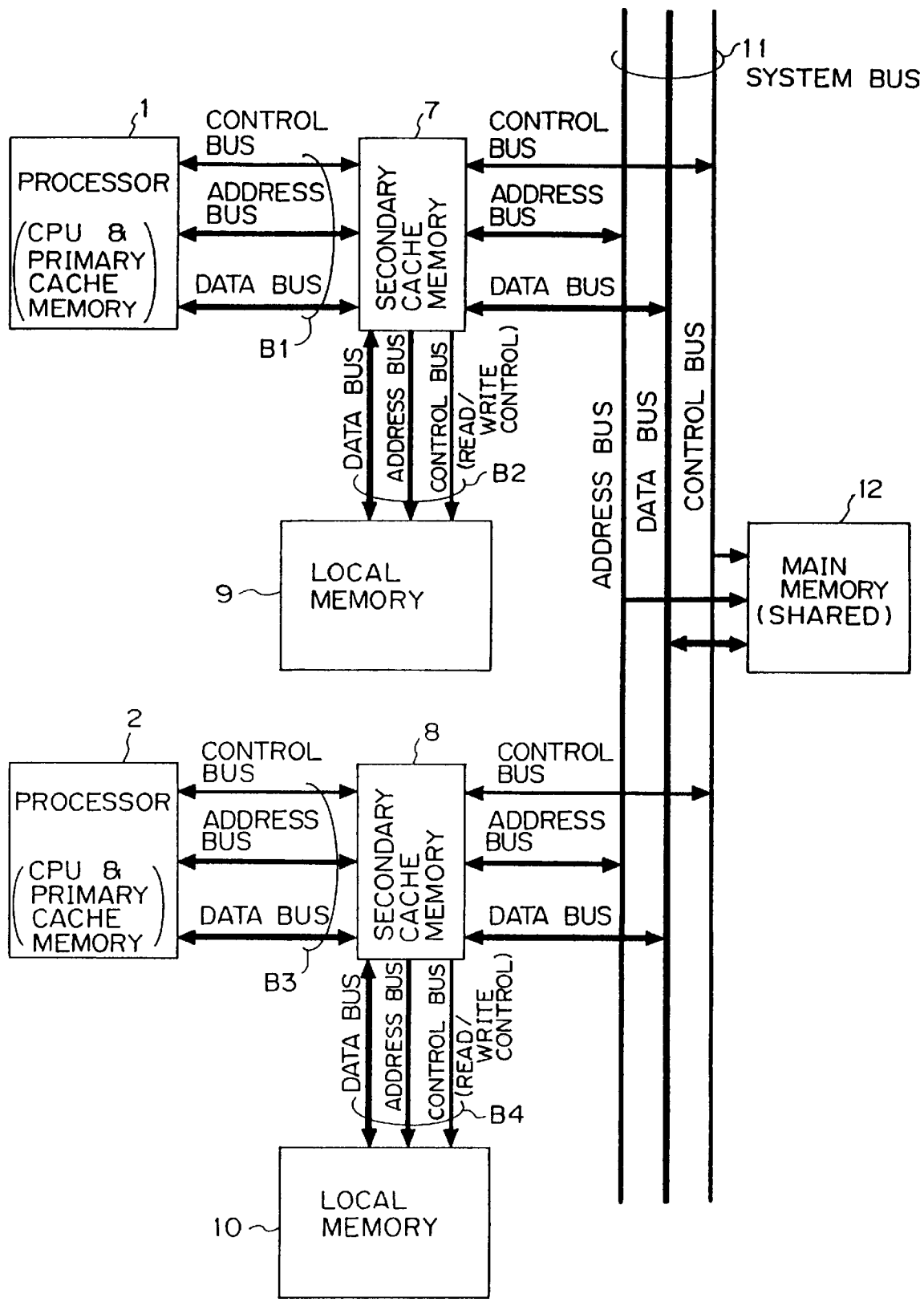
FIG. 2 is a diagram for use in explanation of bus connections in a multiprocessor system.
Figure 3:
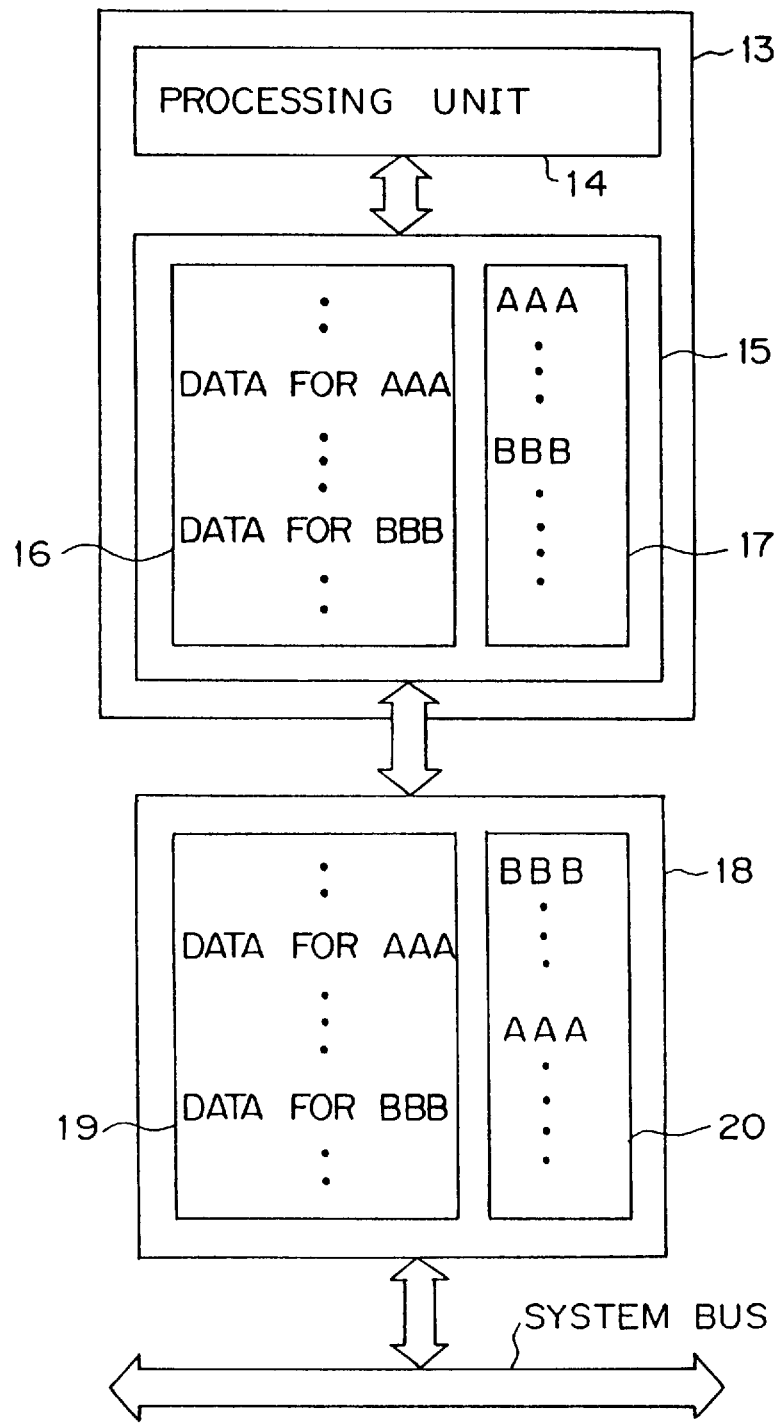
FIG. 3 is a diagram for use in explaining problems associated with conventional hierarchical cache memories.
Figure 4:
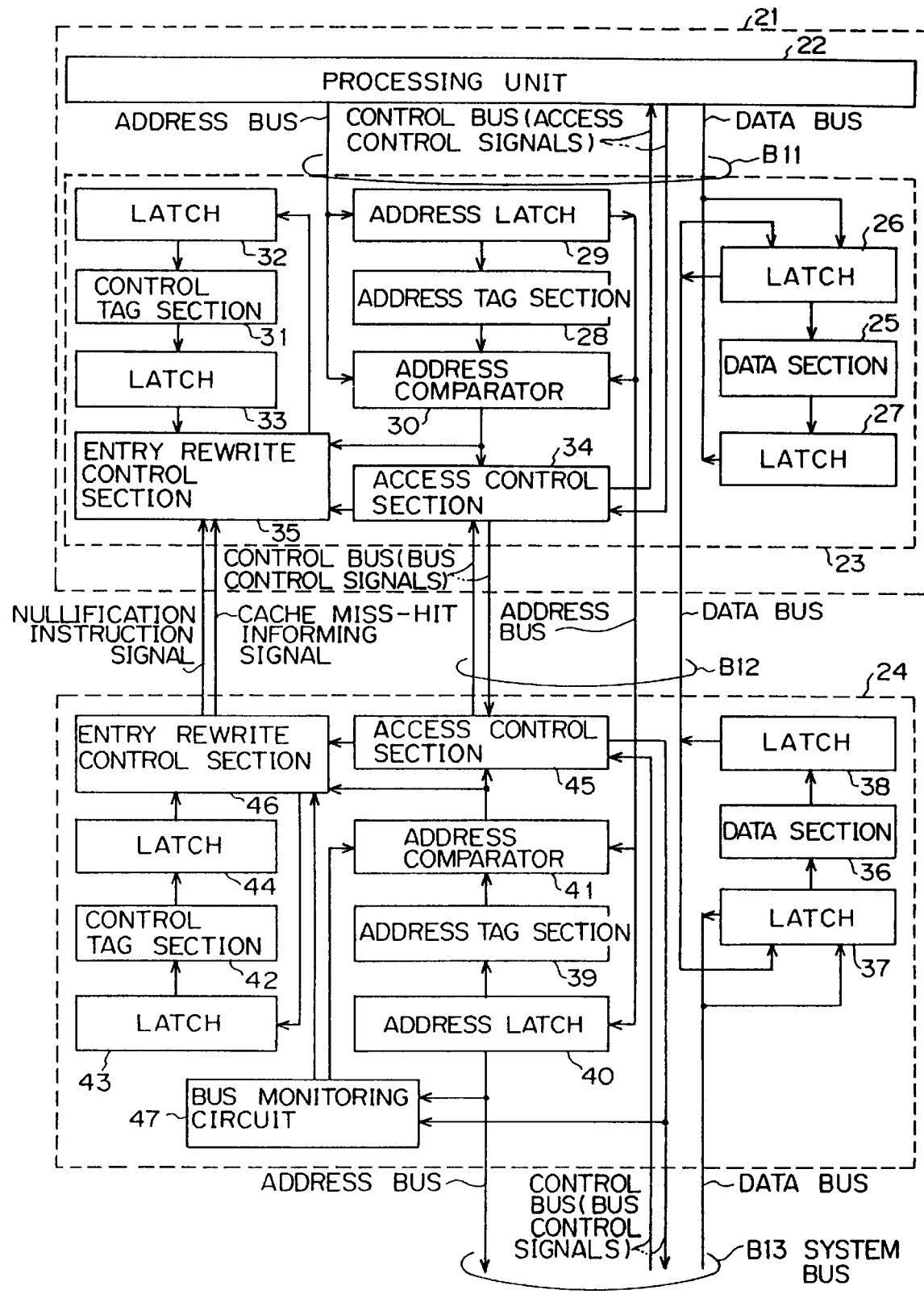
FIG. 4 is a block diagram of an embodiment of the present invention.

FIG. 4 is a block diagram of a preferred embodiment of the present invention. In this figure, 21 denotes a processor, 22 denotes a processing unit in the processor 21, 23 denotes a very-high-speed, small-capacity primary cache memory which is built into the processor 21, and 24 denotes a high-speed, medium-capacity secondary cache memory. The primary cache memory 23 may be formed into a chip or circuit which is independent of the processor 21.

According to the preferred embodiment of the present invention, the primary cache memory 23 and the processor 21 are mounted into the same chip.

In the primary cache memory 23, 25 denotes a data section which stores part of data in a main memory, 26 denotes a latch which temporarily holds data to be written into the data section 25, and 27 denotes a latch which temporarily holds data read from the data section 25.

Reference numeral 28 denotes an address tag section which holds an address for a piece of data stored in the data section 25, and 29 denotes an address latch which holds an access address from the processing unit 22 for outputting to the secondary cache memory 24 at the time of cache miss-hit in the primary cache memory or for address writing at the time of entering an entry.

Reference numeral 30 denotes an address comparator which makes a comparison between an access address held by the address latch 29 and an address stored in the address tag section 28 to make a cache hit/miss-hit decision.

Reference numeral 31 denotes a control tag section which stores control information such as replace priority information, 32 denotes a latch which temporarily holds the control information at the time of writing of the control information, and 33 denotes a latch which temporarily holds control information read out of the control tag section 31.

Reference numeral 34 denotes an access control section which receives an access request from the processing unit 22 to control an operation corresponding to the request and, when a cache miss-hit is found in the primary cache memory 23 or in the case of a write request, outputs the access request to the secondary cache memory 24.

Reference numeral 35 denotes an entry rewrite control section which receives, from the secondary cache memory 24, a cache miss-hit informing signal and a nullification instruction signal to alter and rewrite the replace priority.

In the secondary cache memory 24, 36 denotes a data section which stores part of data in the main memory, 37 denotes a latch which temporarily holds data to be written into the data section 36, and 38 denotes a latch which temporarily holds data read out of the data section 36.

Reference numeral 39 denotes an address tag section which holds an address for data stored in the data section 36, and 40 denotes an address latch which holds an access address transferred from the address latch 29 in the primary cache memory 23 for outputting to the main memory at the time when a cache miss-hit is made in the secondary cache memory and for address writing at the time when an entry is entered.

Reference numeral 41 denotes an address comparator which makes a comparison between an access address held by the address latch 40 and an address stored in the address tag section 39 to make a cache hit/miss-hit decision.

Reference numeral 42 denotes a control tag section which stores control information such as replace priority information, 43 denotes a latch which temporarily holds the control information at the time of writing of the control information, and 44 denotes a latch which temporarily holds control information read out of the control tag section 42.

Reference numeral 45 denotes an access control section which receives an access request from the primary cache memory 23 to control an operation corresponding to the request and, when a cache miss-hit is found in the secondary cache memory 24 or in the case of a write request, outputs an access request to the main memory.

Reference numeral 46 denotes an entry rewrite control section which receives a cache miss-hit signal from the access control section 45, rewrites an entry and supplies a cache miss-hit informing signal and a nullification instruction signal to the primary cache memory 23.

Reference numeral 47 denotes a bus monitoring circuit which monitors the system bus and, upon detecting the writing into the main memory, instructs to check whether there is the corresponding entry data in the secondary cache memory 24.

The processing unit 21 has buses B11 composed of a control bus, an address bus and a data bus. To the data bus of the buses B11 are connected the latches 26 and 27. To the address bus are connected the address latch 29 and the address comparator. To the control bus over which access control signals are sent is connected the access control section 34.

The primary and secondary cache memories 23 and 24 are interconnected by buses B12 composed of a control bus, an address bus and a data bus. The latch 26 in the primary cache memory 23 and the latches 37 and 38 in the secondary cache memory 24 are interconnected by the data bus. The address latch 29 and the address comparator 30 in the primary cache memory 23 and the address latch 40 and the address comparator 41 in the secondary cache memory 24 are interconnected by the address bus. The access control section 34 in the primary cache memory 23 and the access control section 45 in the secondary cache memory 24 are interconnected by the control bus. The entry rewrite control section 35 in the primary cache memory 23 is supplied with a nullification instruction signal and a cache miss-hit informing signal from the entry rewriting control section 46 in the secondary cache memory 24.

The secondary cache memory 24 is connected to the system bus. To the data bus of the system bus B13 is connected the latch 37, to the address bus are connected the address latch 40 and the bus monitoring circuit 47, and to the control bus over which bus control signals are transmitted are connected the access control section 45 and the bus monitoring circuit 47.

Next, the operation of reading from the primary cache memory 23 by the processing unit 22 serving as a central processing unit (CPU) will be described.

The processing unit 22 outputs a request for read access and an access address to the primary cache memory 23. The access control section 34 receives the request for read access, and the address latch 29 latches the access address. Subsequently, the address comparator 30 makes a comparison between the access address held by the address latch 29 and an address stored in the address tag section 28 to make a The result of the cache hit/miss decision being sent to the access control section 34.

In the case of cache hit, the access control section 34 informs the processing unit 22 of the termination of the read access and transfers data read from the data section 25 to the processing unit. The entry rewriting section 35 alters the entry priority and writes its contents into the control tag section 31.

In the case of cache miss-hit, on the other hand, a request for read access is issued from the access control section 34 to the access control section 45 in the secondary cache memory and the access address is output from the address latch 29 to the address latch 40 in the secondary cache memory.

Then, the address comparator 41 makes a comparison between the access address, held in the address latch 40, and an address stored in the address tag section 39 to make a cache hit/miss-hit decision. The result of this decision is sent to the access control section 45.

When a cache hit has been made, the access control section 45 informs the primary cache memory of the termination of the read access and transfers data read from the data section 36 to the primary cache memory 23. The entry rewriting section 46 alters the entry priority and then rewrites its contents into the control tag section 42.

Upon being informed of the termination of the read access, the primary cache memory 23 transfers the received data to the processing unit 22 and enters it into the replacement entry in accordance with the replace priority.

Figure 5:
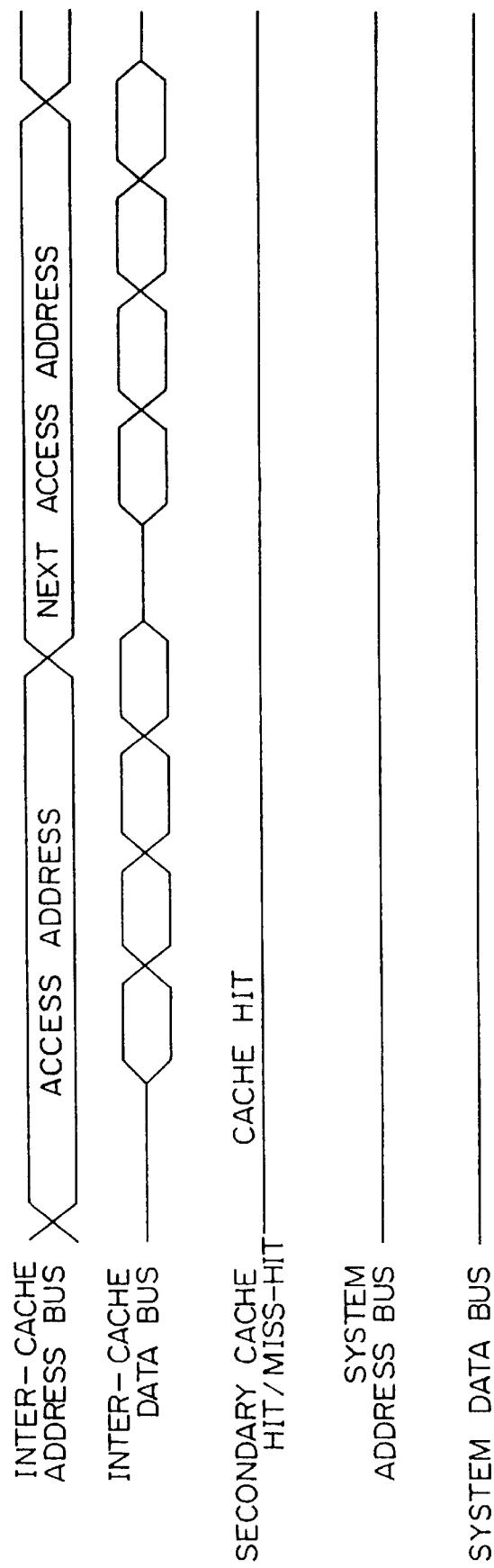
FIG. 5 is a timing chart showing when a cache hit is made in the secondary cache memory 24 at the time of a read access by a processing unit.

FIG. 5 is a timing chart showing when a cache hit is made in the secondary cache memory 24 at the time of read access by the processing unit 22.

When a cache miss-hit is made in the primary cache memory 23, an access address is output onto the address bus of the bus B12 connecting the primary and secondary cache memories 23 and 24 together. It is natural for the address comparator 41 in the secondary cache memory 24 to make a cache hit decision. The result of the cache hit decision is presented to the access control section 45. As a result, the access control section 45 makes access to the data section 36. At this access time, the address output from the primary cache memory 23 has been stored in the address latch 40. This address is used to make access to the address tag section 39, so that the address of the data section 36 that stores data is output.

In response to this address, the data section 36 sequentially outputs data stored therein to the primary cache via the latch 38.

Referring back to FIG. 4, data which is output in sequence is applied to the data section 25 via the latch 26 during read access. The primary cache memory 23 which has been informed of the termination of the read access transfers received data to the processing unit 22. At this point, the access control section 34 in the primary cache memory instructs the entry rewrite control section 35 to store the updated replace priority into the replacement entry, or the control tag section 31 via the latch 32.

Figure 6:
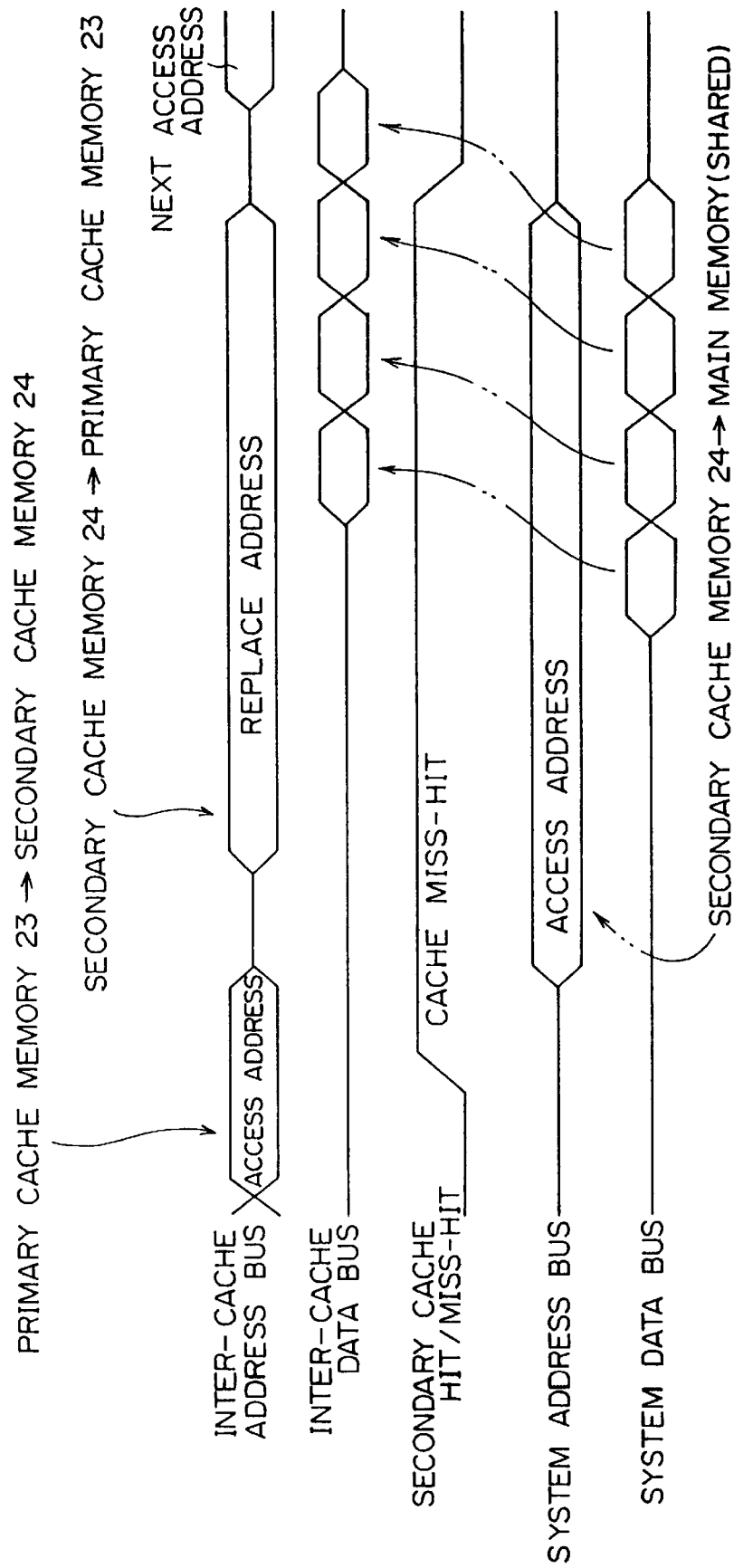
FIG. 6 is a timing showing when a cache miss-hit is made in the secondary cache memory at the time of a read access by a processing unit.

FIG. 6 is a timing chart when a cache miss-hit is made in the secondary cache memory 24 at the time of read access by the processing unit 22. When a cache miss-hit is made, access to the system address bus and the system data bus is made.

When a cache miss-hit is made in the secondary cache memory 24, the access control section 45 issues a request for read access to the main memory (shared memory) via the system bus and the address latch 40 outputs the address output from the primary cache memory 23 to the main memory.

The access control section 45 informs the primary cache memory 23 of the occurrence of the cache miss-hit and outputs the replacement entry address of the secondary cache memory 24 to the primary cache memory 23.

Upon receipt of the replace address from the secondary cache memory 24, the primary cache memory 23 makes a decision of whether it has been entered into the primary cache memory 23 by the address comparator 30 and sends the result to the entry rewriting section 35.

The entry rewriting section 35, when the primary cache memory 23 has an entry corresponding to the replacement entry of the secondary cache memory 24, makes the entry replacement entry of the primary cache memory 23 and, when there is no such entry, determines a replacement entry in accordance with the replace priority.

Upon receipt of data transferred from the main memory, the access control section 45 in the secondary cache memory 24 transfers the read access termination notification and the received data to the primary cache memory 23 and enters the data into the data section 36 in the primary cache memory 24 in accordance with the replace priority.

Upon receipt of read access termination notification, the primary cache memory 23 transfers data received from the secondary cache memory 24 to the processing unit 22 and enters it into the replacement entry already determined. The operation of the primary cache memory at this time is the same as the operation at the time when it receives data from the secondary cache memory 24 as described in connection with FIG. 5.

The writing operation will be described next.

The processing unit 22 outputs a write access request and an access address to the primary cache memory 23. The access control section 34 in the primary cache memory 23 receives the write access request and the address latch 29 holds the access address.

Subsequently, the address comparator 30 makes a comparison between the access address held by the address latch 29 and addresses stored in the address tag section 28 to make a cache hit/miss-hit decision, the result being presented to the access control section 34.

Figure 7:
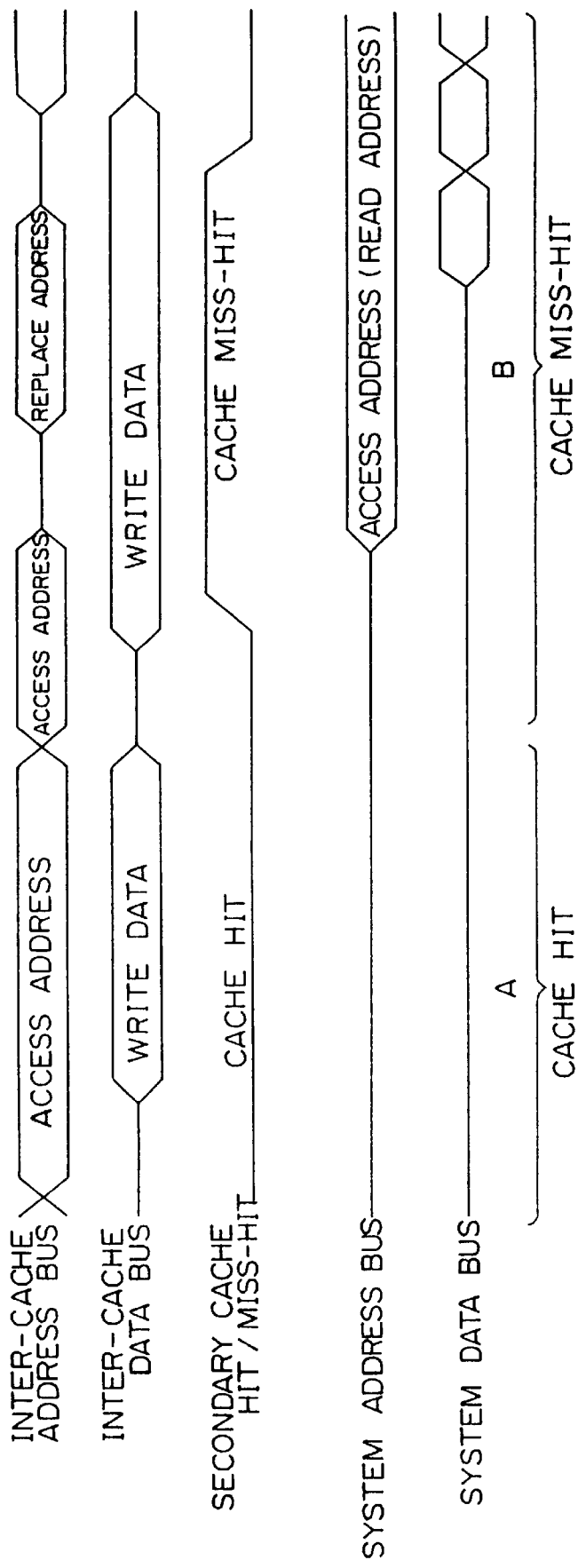
FIG. 7 is a timing chart showing when a cache hit and a cache miss-hit are made in a secondary cache memory at the time of a write access by a processing unit.

A in FIG. 7 is a timing chart when a cache hit is made in the primary cache memory.

In the case of cache hit, data is written into the area of the data section 25 specified by the address tag section. Subsequently the access control section 34 transfers the write access request to the secondary cache memory 24 and the address latch 29 outputs the access address to the secondary cache memory, so that the write access request is fed into the access control section 45 and the access address is held by the address latch 40.

Subsequently the address comparator 41 makes a comparison between the access address held by the address latch 40 and addresses stored in the address tag section 39 to make a cache hit/miss-hit decision. The result is presented to the access control section 45.

In the case of cache hit, the access control section 45 writes data into the data section 36 and informs the access control section 34 in the primary cache memory 23 of the write access termination. The access control section 34 then informs the processing unit 22 of the write access termination.

B in FIG. 7 is a timing chart when a cache miss-hit is made in the secondary cache memory 24. When a cache miss-hit is made in the secondary cache memory 24, the access control section 45 issues a write access request to the main memory via the system bus, and the address latch 40 outputs the access address to the main memory.

The access control section 45 informs the primary cache memory 23 that a cache miss-hit has been made and outputs the address of the replacement entry of the secondary cache memory 24 to the primary cache memory 23.

The primary cache memory 23 receives the replace address from the secondary cache memory 24. The address comparator 30 in the primary cache memory makes a decision of whether the replace address has been entered into the primary cache memory 23, the result being presented to the entry rewriting control section 35.

Then, the entry rewriting control section 35, when there is an entry in the primary cache memory 23 which corresponds to the replacement entry from the secondary cache memory 24, makes the entry a replacement entry for the primary cache memory 23 and, when there is not such an entry, determines the replacement entry in accordance with the replace priority.

When data is transferred from the main memory, the access control section 45 in the secondary cache memory 24 transfers the write access termination notification and the received data to the primary cache memory 23 and enters the data into the data section 36 in the secondary cache memory 24 in accordance with the replace priority.

Upon being informed of the write access termination by the secondary cache memory 24, the primary cache memory 23 transfers the data received from the secondary cache memory 24 to the processing unit 22 and enters the data into the replacement entry already determined.

As described above, according to the present embodiment, when a cache miss-hit is made in the secondary cache memory 24 at the time of read access or write access by the processing unit 22, the secondary cache memory 24 informs the primary cache memory 23 of the address of the replacement entry before data transmission, permitting the replacement of the primary cache memory 23 to be made quickly.

In addition, when the primary cache memory 23, has an entry corresponding to a replacement entry of the secondary cache memory 24, the primary cache memory 23 makes the entry the replacement entry and, when not, makes an entry based on the replace priority the replacement entry, permitting the generation of empty entries to be avoided.

Figure 8:
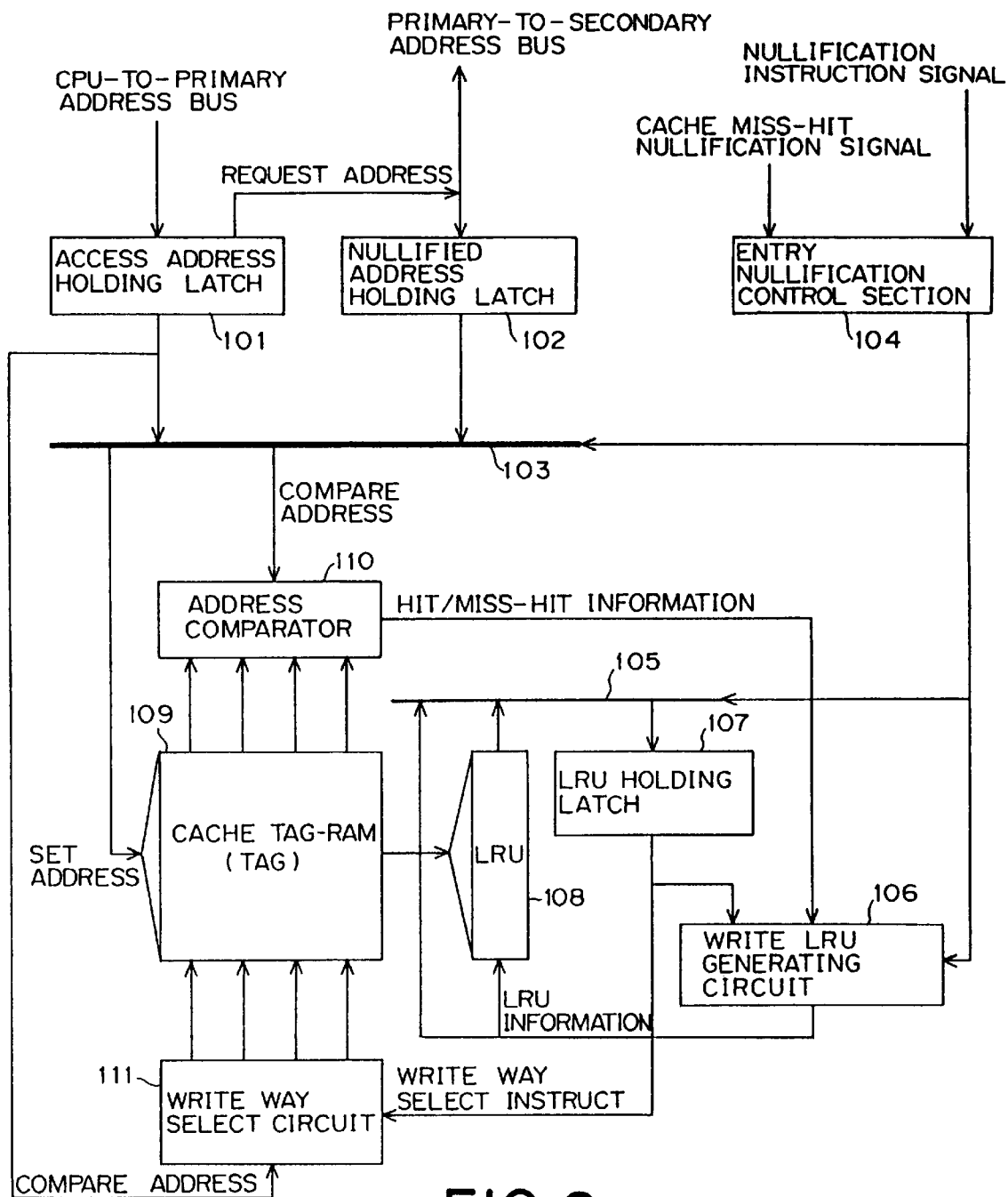
FIG. 8 is a block diagram of a cache entry rewriting section and a tag control section in a primary cache memory.

FIG. 8 is a detailed block diagram of a circuit for performing cache entry rewriting control and tag management for access control in the primary cache memory.

An access address holding latch 101 is connected to the address bus of the processing unit (CPU) 22 to receive an access-requested address. The access address holding latch 101 holds the address and temporarily stores it. At normal access times the latch 101 outputs to a selector 103 a select address for the cache tag section, for example, the medium-order eight bits of a set address and a compare address for address comparison, for example, the high-order 20 bits. The latch 101 outputs a request address onto the address bus between the primary and secondary cache memories so as to transfer an access request to the secondary cache memory at the time of primary cache miss-hit. The latch 101 further outputs a compare address to the cache tag section so as to write the compare address into the cache entry.

A nullified address holding latch 102 is connected to the address bus between the primary and secondary cache memories 23 and 24, and temporarily holds a cache nullifying address and a replace address from the secondary cache memory 24. The latch 102 supplies a select address for the cache tag section, for example, the medium-order eight bits of a set address and a compare address for address comparison, for example, the high-order 20 bits at the time of cache nullification instruction and at the time of secondary cache miss-hit. An entry nullification control section 104 receives a nullification instruction signal and a cache miss-hit notification signal from the secondary cache memory 24. In response to these signals, the entry nullification control section 104 performs the control of switching between the suppliers of the set address for the cache tag and the compare address, that is, the switching control of the selector 103, the control of a write LRU generating circuit 106, and the input switching control of an LRU holding latch 107, that is, the switching control of a selector 105.

When the cache nullification instruction signal or the secondary cache miss-hit notification signal is asserted, the sources of the cache tag set address and the compare address are switched from the access address holding latch 101 to the nullification address holding latch 102. At normal access times the write LRU generating circuit 106 makes the priority of the way of an entry which has been cache hit the highest priority. When the cache nullification instruction signal or the cache miss-hit notification signal is asserted, the LRU generating circuit nullifies the entry which has made a cache hit.

The selector 105 is controlled in such a way that the LRU holding latch 107 receives data resulting from nullifying the replacement entry from the write LRU generating circuit 106 in place of data from an LRU section 108 at the time of secondary cache miss-hit.

The LRU holding latch 107 is a latch which temporarily holds LRU information for specifying the way of entering cache entry and rewriting LRU information.

The cache TAG-RAM section 109 is a RAM for storing address information of data entered into the cache, that is, compare addresses. Four compare addresses designated by a set address are simultaneously read from the RAM for application to the address comparator. In the present embodiment, the TAG-RAM section is 4-way set associative, four entries are selected simultaneously.

The address comparator 110 receives four compare addresses from the cache TAG-RAM 109 for comparison with a compare address from the access address holding latch 101 or the nullified address holding latch 102. The results for four comparisons are output as cache hit/miss-hit information. When the four address comparisons all indicate miss-hit, a primary cache miss-hit signal is output which indicates that a cache miss-hit has been made in the primary cache memory. When the primary cache miss-hit signal is asserted, the access address holding latch outputs an access address onto the address bus between the primary and secondary cache memories.

The write way select circuit 111 is a circuit which, in entering data into the cache, selects which way the cache is to be written into. Which way the cache is to be written into is determined by a control signal from the LRU holding latch 107.

Figure 9:
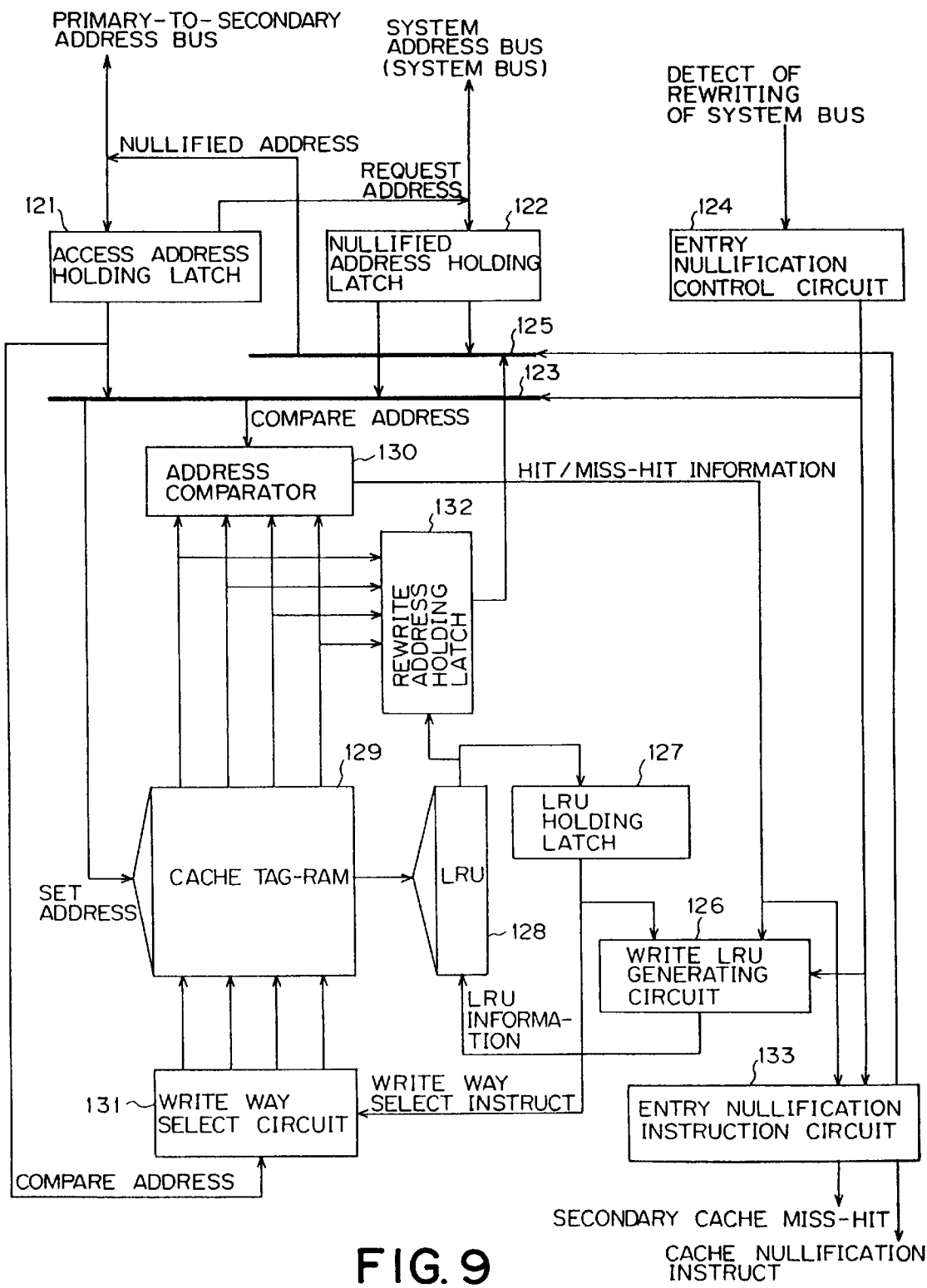
FIG. 9 is a block diagram of a cache entry rewriting section and a tag control section in a secondary cache memory.

FIG. 9 is a detailed block diagram of circuitry for secondary cache entry rewriting control and tag management for access control in the present embodiment, which is constructed from access address holding latch 121, nullified address holding latch 122, entry nullification control circuit 124, selectors 123 and 125, write LRU generating circuit 126, LRU holding latch 127, cache TAG-RAM 129, address comparator 130, write way select circuit 131, rewrite address holding latch 132, and entry nullification instruction circuit 133.

The basic arrangement is the same as the circuit arrangement of FIG. 7 that performs the primary cache entry rewriting control and tag control. It is distinct from the arrangement of FIG. 7 in that there are provided a rewrite address holding latch 132 which holds a rewrite address in order to inform the primary cache of a replace address at the time of replacement of the secondary cache and a selector 125 which outputs a cache nullification instruction signal and a secondary cache miss-hit signal and outputs a nullified address onto the address bus between the primary and secondary cache memories when a cache entry is nullified in the secondary cache memory and an entry of the secondary cache memory is replaced.

The write address holding latch is a latch which temporarily holds the address of the lowest priority entry when access is made to the secondary cache. The lowest priority entry of four entries is specified by LRU information from the LRU section.

When a cache miss-hit is made in the secondary cache at normal access times, the entry nullification instruction circuit asserts a secondary cache miss-hit signal so that a nullified address is output from the rewrite address holding latch onto the address bus between the primary and secondary cache memories. When a cache hit is made in the secondary cache after the nullifying operation on a cache entry as the result of the detection through the system bus that a shared memory has been rewritten, the circuit performs nullification control on the entry and asserts a secondary cache nullification instruction signal for the primary cache so that a nullified address is output from the nullified address holding latch onto the address bus between the primary and secondary cache memories.

Next, the operation of the circuit arrangements of FIGS. 8 and 9 will be described in detail using examples.

FIG. 8 is a block diagram showing a part of the primary cache according to the embodiment of the present invention, and is to explain in detail the entry rewrite control section for the primary cache memory. To clarify the connection among units, the address tag section 28 for the primary cache memory and, the control tag unit 31 are included in the diagram. The address tag section 28 corresponds to the cache TAG-RAM 109, and the control tag section 31 corresponds to the LRU 108.

FIG. 9 is a block diagram showing a part of the secondary cache memory according to the embodiment and indicates in detail the entry rewrite control section for the secondary cache memory. To clarify the connection among units, the address tag section 39 for the secondary cache memory and the control tag unit 42 are included in the diagram. The address tag section 39 corresponds to the cache TAG-RAM 129 and the control tag section 42 corresponds to the LRU 128.

FIG. 10 shows the relationship of the four-way set associative (256 sets, 1024 entries in total) primary cache tags to the LRU. When 16-byte data is contained in one entry, the lowest order four bits of the 32-bit address are used for address designation within entries, the low-order eight bits are used for selecting a set in the cache, and the high-order 20 bits are used for address comparison. In the tag of the cache are stored the high-order 20 bits of the address for address comparison. In FIG. 10, the address entered into the entry of the way 0 of the set address 00 is "00000"+"00"[(set address)+"*"(address within entry)].

The contents of the LRU hold the priorities of the ways within a cache set which depend on whether or not access has been made recently. In the example of FIG. 10, the way numbers are rearranged in the order of descending priorities in order to facilitate the description. In this example, the LRU for the set address 00 is 1302, which means that the priorities of the ways for the set address 00 decrease in the order 1, 3, 0 and 2. At this point, the way 2 is the most-rarely-accessed entry, which becomes a candidate for replacement when a cache miss-hit is made at the time of access to the set address 00.

FIG. 11 shows the relationship of the four-way associative (1024 sets, 4096 entries in total) secondary cache tags to the LRU. When 16-byte data is contained in one entry, the lowest order four bits, of 32 address bits, are used for address designation within an entry, the low-order 10 bits are used for selecting a set in the cache, and the high-order 18 bits are used for address comparison. In the tag of the cache are stored the high-order 18 bits of the corresponding address for address comparison. Although the tag address within the entry of FIG. 11 is represented by 20 bits in order to facilitate the description in hexadecimal representation, the low-order two bits are not actually stored in the tag. In this example, the secondary cache is made larger in capacity than the primary cache by increasing the number of sets or entries with the ways kept unchanged in number. It is also possible to make the capacity of the secondary cache larger by increasing the number of ways without changing the number of sets or increasing the numbers of both the sets and ways.

The LRU stores the priorities of the ways within the corresponding cache set, which depend on whether or not access has been made recently. To facilitate description, FIG. 11 shows an example in which the way numbers are rearranged in the order of descending priorities.

If the processing unit 22, the CPU, makes read access to the address 00008000 at the time when the primary cache memory 23 is in the state of FIG. 10 and the secondary cache memory 24 is in the state of FIG. 11, then the present embodiment will operate as follows. (A1) The primary cache receives an access request from the processing unit 22, the CPU, and stores an access address in the access address holding latch 121. (B1) The address comparator 110 refers to the four entries in the set address 00 for address comparison. Since no address match is found with any of the four entries shown in FIG. 10, the access control section 34 transfers the access request to the secondary cache memory. At this point, the contents of the LRU for the set address 00 are temporarily stored in the LRU holding latch 109. (C1) The secondary cache memory 24 receives the access request from the primary cache memory 23 and stores the address in the access address holding latch 121. (D1) The address comparator 130 refers to the four entries in the set address 000 for address comparison. Since no address match is found with any of the four entries, the access control section 45 transfers the access request to the system bus. At this point, the contents of the LRU for the set address 000 are temporarily stored in the LRU holding latch. To inform the primary cache memory 23 of the replace address, the LRU 128 outputs the address of an entry to be replaced to the rewrite address holding latch 132. (E1) The secondary cache memory 24 informs the primary cache memory 23 of cache miss-hit having been made in the secondary cache memory 24 and transfers the address of the entry to be replaced via the primary-to-secondary address bus. (F1) The primary cache memory 23 receives the address to be replaced from the secondary cache memory 24 and stores it in the nullified address holding latch 102. (G1) A reference is made to the four entries for the set address 00 for address comparison. Since an address match is found with one of the four entries, LRU information which has nullified the entry is generated and temporarily held in the LRU holding latch 107. (H1) Upon receipt of data (response) access-requested from the system bus 11, the secondary cache memory 24 enters the secondary cache entry into the way indicated by the LRU holding latch 127 and transfers tho data to the primary cache memory 23.

(I1) Upon receipt of data (response) access-requested from the secondary cache memory 24, the primary cache memory 23 enters a primary cache entry into the way indicated by the LRU holding latch 107 and transfers the data to the processing unit 22, the CPU.

As a result, the primary cache memory 23 i s placed in the tag and LRU state shown in FIG. 12. This access processing alters only the entry for the way 0 in the set address da to 00008. The secondary cache memory 24 is placed in the tag and LRU state shown in FIG. 13. The entry for the way 0 in the set address 000 is replaced with 00008 by this access processing.

If the processing unit 22 makes read access to the address 00009000 at the time when the primary cache memory 23 is in the state of FIG. 10 and the secondary cache memory 24 is in the state of FIG. 11, then the present embodiment will operate as follows.

(A2) The primary cache receives an access request from the processing unit 22 and stores an access address in the access address holding latch 121.

(B2) The address comparator 110 refers to the four entries in the set address 00 for address comparison. Since no address match is found with any of the four entries shown in FIG. 10, the access control section 34 transfers the access request to the secondary cache memory. At this point, the contents of the LRU for the set address 00 are temporarily stored in the LRU holding latch.

(C2) The secondary cache memory 24 receives the access request from the primary cache memory 23 and stores the address in the access address holding latch 121.

(D2) The address comparator 130 refers to the four entries for the set address 000 for address comparison. Since no address match is found with any of the four entries, the access control section 45 transfers the access request to the system bus. At this point, the contents of the LRU for the set address 000 are temporarily stored in the LRU holding latch. To inform the primary cache memory 23 of the replace address, the LRU 128 outputs the address of an entry to be replaced to the rewrite address holding latch 132.

(E2) The secondary cache memory 24 informs the primary cache memory 23 of a cache miss-hit having been made in the secondary cache memory 24 and transfers the address of the entry to be replaced via the primary-to-secondary address bus.

(F2) The primary cache memory 23 receives the address to be replaced from the secondary cache memory 24 and stores it in the nullified address holding latch 102. (A2) through (F2) are identical to (A1) through (F1).

(G2) A reference is made to the four entries for the set address 00 for address comparison. Since no address match is found with any of the four entries, the LRU holding latch 107 holds the previous value.

(H2) Upon receipt of data (response) access-requested from the system bus 11, the secondary cache memory 24 enters the secondary cache entry into the way indicated by the LRU holding latch 127 and transfers the data to the primary cache memory 23.

(I2) Upon receipt of data (response) access-requested from the secondary cache memory 24, the primary cache memory 23 enters an primary cache entry into the way indicated by the LRU holding latch 107 and transfers the data to the processing unit 22.

As a result, the primary cache memory 23 is placed in the tag and LRU state shown in FIG. 14. This access processing alters only the entry for the way 2 in the set address 00.

In this case, the contents of the entries in the primary cache do not differ between the present invention and the prior art. However, since the cache nullification processing has only to be performed only at the time of read access, and next access is allowed, the present invention provides faster processing.

In the prior art primary cache memory, a secondary cache miss-hit signal is not supplied from the secondary cache memory to the entry nullification control section and the LRU holding latch is not provided with a feedback route from the write LRU generating circuit. In the conventional secondary cache memory, the entry nullification instruction circuit is not supplied with a secondary cache miss-hit signal which indicates that a cache miss-hit has been made in the secondary cache memory at normal access times. That is, no secondary cache miss-hit signal is supplied to the primary cache memory.

If, for example, the processing unit 22 makes read access to the address 00008000 when the primary cache is in the state of FIG. 10 and the secondary cache 24 is in the state of FIG. 11, the conventional primary and secondary caches will operate as follows. Although the initial operations (A3) through (D3) are identical to (A1) through (D1) described above, subsequent operations differ.

(A3) The primary cache memory receives an access request from the CPU and stores the access address in the access address holding latch.

(B3) A reference is made to four entries in the set address 00 for address comparison. Since no address match is found with any of the four entries, the access request is transferred to the secondary cache memory. The contents of the LRU for the set address 00 are temporarily held in the LRU holding latch.

(C3) The secondary cache memory receives the access request from the primary cache memory and stores the address in the access address holding latch.

(D3) A reference is made to four entries in the set address 000 for address comparison. Since no address match is found with any of the four entries, the access request is transferred to the system bus. The contents of the LRU for the set address 000 are temporarily held in the LRU holding latch. To inform the primary cache of the replace address, the address of an entry whose replacement is indicated by the LRU is stored in the rewrite address holding latch.

(E3) When data (response) required is transferred from the system bus to the secondary cache memory, the secondary cache memory enters the secondary cache entry into the way indicated by the LRU holding latch and transfers the data to the primary cache memory.

(F3) Upon receipt of the data (response) access-requested from the secondary cache memory, the primary cache memory enters the primary cache entry into the way indicated by the LRU holding latch and transfers the data to the CPU.

(G3) The secondary cache memory instructs the primary cache memory to nullify the cache entry and transfers the address of the replacement entry to the primary cache.

(H3) The primary cache memory receives the replace address from the secondary cache memory and stores it in the nullified address holding latch.

(I3) A reference is made to four entries in the set address 00 for address comparison. Since an address match is found with one of the four entries, LRU information which has nullified that entry is generated and written into the LRU.

As a result, the primary cache is placed in the state shown in FIG. 15. This access changes the nullification of the entry of the way 0 in the set address 00 and the replace processing for the entry of the way 2. The secondary cache is placed in the state of FIG. 14. This access processing permits the entry of the way 0 in the set address 000 to be replaced.

As can be seen from the foregoing, the present invention, does not perform unnecessary nullification (indicated by xxxxx in FIG. 15) of cache entry, permits a more efficient utilization of the primary cache.

Since, in the prior art, the relationship between the primary and secondary caches is not controlled, it is necessary to inform the primary cache of all operations of rewriting the system bus. According to the present invention, however, since entry rewrite control is performed between the primary and secondary caches, it is necessary to tell the primary cache to nullify only when cache entry nullification is performed in the secondary cache.

The secondary cache memory 24 in the present embodiment monitors the system bus so that a data mismatch may not occur between the cache and the shared memory which can be rewritten by another CPU. For this reason, when the secondary cache has no right of the system bus, it receives system bus control signals and address signals output from the secondary cache memory associated with another CPU to monitor for rewriting of the shared memory and refers to the secondary cache each time the shared memory is rewritten. When a cache hit is made, that is, when there is the possibility that a data mismatch may occur between the cache memory 24 and the shared memory, the cache entry is made invalid, thereby guaranteeing data match between the cache and the shared memory.

As described above, according to the present invention, when a cache miss-hit is made in the secondary cache memory at the time of read access or write access by the processing unit, the secondary cache memory alerts the primary cache memory to the address of the replacement entry prior to data transmission. Therefore, the primary cache memory can be replaced rapidly. Further, the primary cache memory, when it has the corresponding entry, makes the entry the replacement entry and, when not, makes an entry based on the replace priority the replacement entry, permitting the generation of an empty entry to be avoided and the performance to be improved.

Even when one entry of the primary cache memory and one entry of the secondary cache memory are made equal to each other in data capacity, the generation of empty entry can be avoided.

If the primary and secondary cache memories are arranged such that, when the main memory is rewritten, the secondary cache memory, if it has an entry corresponding to the address of the rewritten memory, makes that entry invalid, instructs the primary cache memory to make the corresponding entry invalid, and outputs the address of the entry which has been made invalid by the secondary cache memory to the primary cache memory, and the primary cache memory, when it has that entry, makes the entry invalid, then data existing in the primary cache memory can also be made to exist in the secondary cache memory, permitting data security to be ensured even if an entry is made invalid in the secondary cache memory.

What is claimed is:

1. A hierarchical cache memory system in which a processing unit performs processing independent of a system bus to which a main memory is connected, the hierarchical cache memory system comprising:

a primary cache memory connected to the processing unit to which the processing unit makes direct access;

a second cache memory connected between said primary cache memory, said main memory and the system bus such that the processing unit cannot accesses the system bus except through said secondary cache memory; and a first entry rewrite control means, provided in said primary cache memory, for receiving an address corresponding to a replacement entry, which is an entry to be invalidated, from said secondary cache memory when a cache miss-hit is made in said secondary cache memory and when said primary cache memory has a corresponding entry to the replacement entry, making the corresponding entry the replacement entry otherwise setting the replacement entry based on a predefined replace priority; and a second entry rewrite control means, provided in said secondary cache memory, for transferring the address of the replacement entry to said primary cache memory prior to a transfer of data to said primary cache memory when said cache miss-hit is made in said secondary cache memory;

wherein when said secondary cache memory has a first entry corresponding to an address in the main memory which is to be rewritten, said second entry rewrite control means makes the first entry invalid and directs said primary cache memory to make a corresponding entry invalid and outputs the address of the first entry to said primary cache memory, and said first entry rewrite control means invalidates the corresponding entry in said primary cache memory.

2. A hierarchical cache memory system in which a processing unit performs processing independent of a system bus to which a main memory connected, the hierarchical cache memory system comprising;

a primary cache memory to which the processing unit makes direct access;

a secondary cache memory connected between said primary cache memory and the main memory such that the processing unit cannot accesses the system bus except through said second cache memory; and a first entry rewrite control means provided in said secondary cache memory for transferring the address of a replacement entry to said primary cache memory prior to a transfer of data to said primary cache memory when a cache miss-hit is made in said secondary cache memory; and a second entry rewrite control means, provided in said primary cache memory, for receiving an address corresponding to a replacement entry, which is an entry to be invalidated, from said secondary cache memory when said cache miss-hit is made in said secondary cache memory and when said primary cache memory has a corresponding entry to the replacement entry, making the corresponding entry the replacement entry otherwise setting the replacement entry based on a predefined replace priority;

wherein when said secondary cache memory has a first entry corresponding to an address in the main memory which is to be rewritten, said second entry rewrite control means makes the first entry invalid and directs said primary cache memory to make a corresponding entry invalid and outputs the address of the first entry to said primary cache memory, and said first entry rewrite control means invalidates the corresponding entry in said primary cache memory.

3. A hierarchical cache memory system in which a processing unit performs processing independent of a system bus to which a main memory is connected, the hierarchical cache memory system comprising:

a primary cache memory to which the processing unit makes direct access;

a secondary cache memory connected between said primary cache memory, said main memory and said system bus such that the processing unit cannot accesses the system bus except through said secondary cache memory;

said primary cache memory including a first entry rewrite control means to receive the address of a replacement entry from said secondary cache memory when a cache miss-hit is made in said secondary cache memory and when said primary cache memory has a corresponding entry to the replacement entry, making the corresponding entry the replacement entry otherwise setting the replacement entry based on a predetermined replace priority; and said secondary cache memory including a second entry rewrite control means which, when a cache miss-hit is made in said secondary cache memory, transfers the address of the replacement entry to said primary cache memory prior to a transfer of data to said primary cache memory;

wherein when said secondary cache memory has a first entry corresponding to an address in the main memory which is to be rewritten, said second entry rewrite control means makes the first entry invalid and directs said primary cache memory to make a corresponding entry invalid and outputs the address of the first entry to said primary cache memory, and said first entry rewrite control means invalidates the corresponding entry in said primary cache memory.

4. The system according to claim 3, wherein at least one entry of said primary cache memory has a data capacity equal to that of said secondary cache memory.

5. A method of controlling a hierarchical memory system having a cache memory divided into a hierarchically-ordered primary cache memory and a larger secondary cache memory comprising steps of:

accessing a main memory and a system bus solely through the primary cache memory;

notifying the primary cache memory of an address of a replacement entry prior to transferring data from the secondary cache memory when a cache miss-hit is made in the secondary cache memory at the time of access by a processing unit;

if a corresponding entry exists in the primary cache memory, making the corresponding entry a replacement entry in the primary cache memory;

if a corresponding entry does not exist in the primary cache memory, making an entry based on a predetermined replace priority, the replacement entry in the primary cache memory; and entering data transferred from said secondary cache memory into the replacement entry in said primary cache memory;

if an address in said main memory is to be rewritten and the secondary cache memory bag a first entry corresponding to the address making the first entry invalid, directing the primary cache memory to make the first entry invalid, and outputting the address of the first entry to said primary cache memory; and if the primary cache memory has a second entry corresponding to the first entry, making the second entry invalid.

6. The method according to claim 5, wherein said processing unit access the secondary cache memory using read or write access.

7. A hierarchical cache memory system comprising:

a processor unit having an operating unit;

a first cache memory for storing entries of data stored in a main storage said operating unit accessing an external system bus through said first cache memory, wherein said first cache memory comprises:

an access control unit for replacing an entry in the cache memory where an entry corresponding to an address corresponding to a replacement entry has been informed externally when a cache miss-hit occurs, making the corresponding entry a replacement entry, if no corresponding entries exist in the cache memory, determining a replacement entry based on a predetermined order of priority, and then entering externally transmitted data in the replacement entry;

a first memory for storing the entries;

a first address tag unit for storing an address of data stored in said first memory;

a first comparing unit for comparing an address outputted by said processor unit with an address stored in said first address tag unit and determining if a cache hit is made; and a second cache memory connected to said processor unit comprises:

a second memory for storing the entries;

a second address tag unit for storing an address of data stored in said second memory;

a second comparing unit for comparing an access address to said main storage when a cache miss-hit takes place in said first cache memory, with an address stored in said second address tag unit, and for determining if a cache hit has been made; and access control means for outputting to said first cache memory an address of a replacement entry when said second comparing unit determines that no cache hit is detected, and then transmitting the data.

8. The hierarchical cache memory system according to claim 7, wherein said cache memory comprises:

a least recently used data memory for storing least recently used data at said address stored in said first address tag unit; and a least recently used data write generating circuit for assigning a highest priority to an entry involved in a cache hit, and nullifying an entry involved in one of a cache miss-hit and an invalid cache hit.

* * * * *